United States Patent
Kuo

[11] Patent Number: 6,144,430
[45] Date of Patent: *Nov. 7, 2000

[54] REFLECTIVE-TYPE LIQUID CRYSTAL DISPLAY WITH SINGLE POLARIZER AND AN INNER METALLIC REFLECTOR

[75] Inventor: Chen-Lung Kuo, Hsinchu, Taiwan

[73] Assignee: Industrial Technology Research Institute, Hsinchu Hsien, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/974,673

[22] Filed: Nov. 19, 1997

[51] Int. Cl.[7] .............................. G02F 1/1335; G02B 5/18
[52] U.S. Cl. .............................. 349/113; 349/112; 349/67; 349/96; 359/572
[58] Field of Search .................................. 349/112, 113, 349/96, 67; 359/224, 571, 572, 855, 15

[56] References Cited

U.S. PATENT DOCUMENTS

| | | | |
|---|---|---|---|
| 3,960,438 | 6/1976 | Bonne et al. | 350/160 |
| 4,185,895 | 1/1980 | Stephens et al. | 350/345 |
| 4,239,349 | 12/1980 | Scheffer | 349/112 |
| 4,456,336 | 6/1984 | Chung et al. | 350/338 |
| 4,660,936 | 4/1987 | Nosker | 350/339 |
| 5,128,787 | 7/1992 | Blonder | 359/70 |
| 5,182,663 | 1/1993 | Jones | 359/70 |
| 5,418,631 | 5/1995 | Tedesco | 359/15 |
| 5,629,784 | 5/1997 | Abileah et al. | 349/112 |
| 5,659,408 | 8/1997 | Wenyon | 349/113 |
| 5,714,247 | 2/1998 | Kuo et al. | 428/323 |
| 5,796,455 | 8/1998 | Mizobata et al. | 349/116 |
| 5,812,229 | 9/1998 | Chen et al. | 349/113 |
| 5,818,554 | 10/1998 | Hiyama et al. | 349/113 |
| 5,828,471 | 10/1998 | Davis et al. | 359/15 |
| 5,841,496 | 11/1998 | Itoh et al. | 349/113 |
| 5,889,570 | 3/1999 | Mitsui et al. | 349/113 |

*Primary Examiner*—James A. Dudek
*Assistant Examiner*—Tarifur R. Chowdhury
*Attorney, Agent, or Firm*—McDermott, Will & Emery

[57] ABSTRACT

One polarizer reflective-type color liquid crystal display has been developed. Reflective-type liquid crystal display have found increasingly important for both direct-view and projection displays. Attractive features such as high contrast ratio, mirror reflection reduced, and clear image of no parallax are demonstrated. This design uses single polarizer to enhanced the brightness and an inner metallic reflector to avoid parallax.

8 Claims, 8 Drawing Sheets

REFLECTIVE-TYPE LIQUID CRYSTAL DISPLAY WITH SINGLE POLARIZER AND AN INNER METALLIC REFLECTOR

FIELD OF THE INVENTION

The present invention relates to a flat panel display, and more specifically, to a single-polarizer reflective type LCD.

BACKGROUND OF THE INVENTION

Most of the displays currently used for portable information equipments are monochrome reflective LCDs whose conventional transmissive TN or STN LCD backlight is just replaced by a reflector. However, these reflective LCDs are not appropriate either for color due to not enough brightness or for high resolution because of a parallax caused by the two polarizer-structure.

As discussed above, conventional reflective LCDs is composed of TN-mode or STN-mode with two polarizers and diffusing reflector placed behind the LCD panel. Problems of this type LCD are parallax and low brightness which limits its application in portable high information tools such as hand-held personal computers. To improve these problems, a single-polarizer reflective TFT LCD have been developed, this display composed of a front scattering film, a polarizer, a retardation film, and a TFT LCD panel. A reflective film was formed in the TN LC cell. (AM-LCD'96/IDW'96, P.329–332, FIG. 1) This structure raise the required characteristics of reflective LCDs as follows. Brightness is raised by using one polarizer, and the view angle is increased due to the front scattering film can eliminate the mirror reflection. However, we found that the characteristics of the single-polarizer R-LCD(reflective LCD) were easily influence by the back scattering of the front-scattering-film. Especially, in the color display, the contrast greatly went down and the deterioration of color reproduction was obvious. For example, the contrast ratio of this case is only 6:1.

SUMMARY OF THE INVENTION

It is an object of the present invention to provide a solution to the above-mentioned problems.

According to the invention, there are provided several kinds of single-polarizer reflective LCD structure. In the first embodiment, This display composes of a polarizer, a quarter-wave retardation film, a diffuser film, and a LCD cell. The diffuser film is formed atop the LCD cell, the quarter-wave retardation film is formed atop the diffuser film, and the polarizer is formed atop the quarter-wave film. To form the LCD cell, a TFT substrate comprising TFTs, display electrode(metallic reflective electrode), etc., deposed like a matrix on a transparent substrate such as glass, and an opposed substrate having color filter covered by an ITO common electrode are affixed with a several µm thick liquid crystal layer between them.

In this preferred embodiment, the diffusive film is located between the LCD cell and the polarizer/quarter-wave retardation film. The diffusive film have characteristics of low backward scattering, low depolarization, and no retardation. Due to these, the polarizer will absorb the backward scattering, and the contrast ratio will be raised.

In second preferred embodiment, there are blazed reflectors in a single polarizer reflective LCD. The blazed reflectors could effect the direction of reflective light beam, resulting the maximum contrast ratio and the maximum brightness at the same viewing polar angle.

In third embodiment, a translucent holographic film is located at the outer of the reflective LCD. This holographic film can adjust the path of the light beam, resulting the scattering angle very close to the normal of the LCD panel while the direction of incident light beam is off-normal. The maximum contrast ratio and the maximum brightness will be observed at the same viewing polar angle.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention relates to a flat panel display, and more specifically, to a single-polarizer reflective type LCD.

Figure 1:
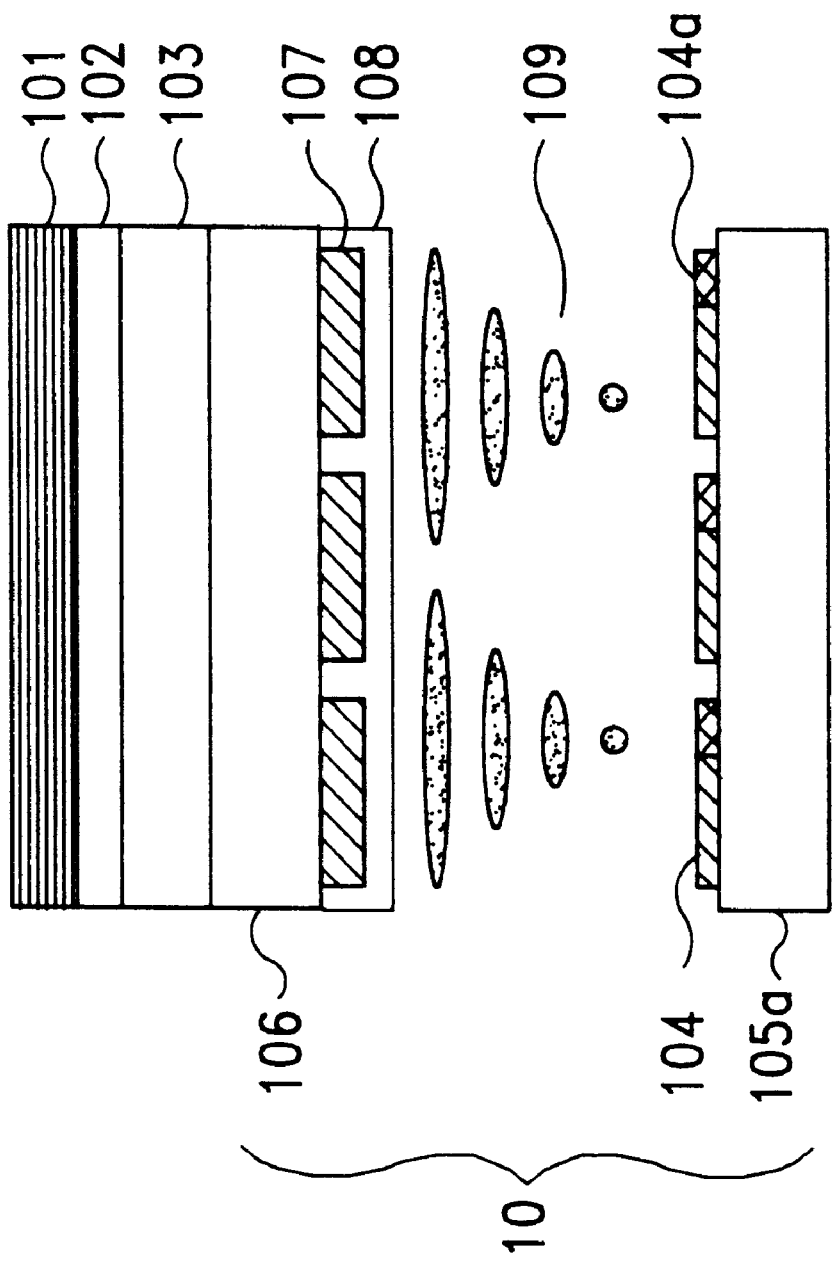
FIG. 1 is a schematic diagram of a reflective color TFT LCD according to the present invention.

FIG. 1 shows the structure of our newly developed single-polarizer type reflective TFT-LCD. This display composes of a polarizer 101, a quarter-wave retardation film 102, a diffuser film 103, and a LCD cell 10. The diffuser film 103 is formed atop the LCD cell 10, the quarter-wave retardation film 102 is formed atop the diffuser film 103, and the polarizer 101 is formed atop the quarter-wave film 102. To form the LCD cell 10, a TFT substrate comprising TFTs 104a, display electrode (reflective electrode) 104, etc., deposed like a matrix on a transparent substrate 105 such as glass, and an opposed substrate 106 having color filter 107 covered by an ITO common electrode 108 are affixed with a several µm thick liquid crystal layer 109 between them.

Figure 2:
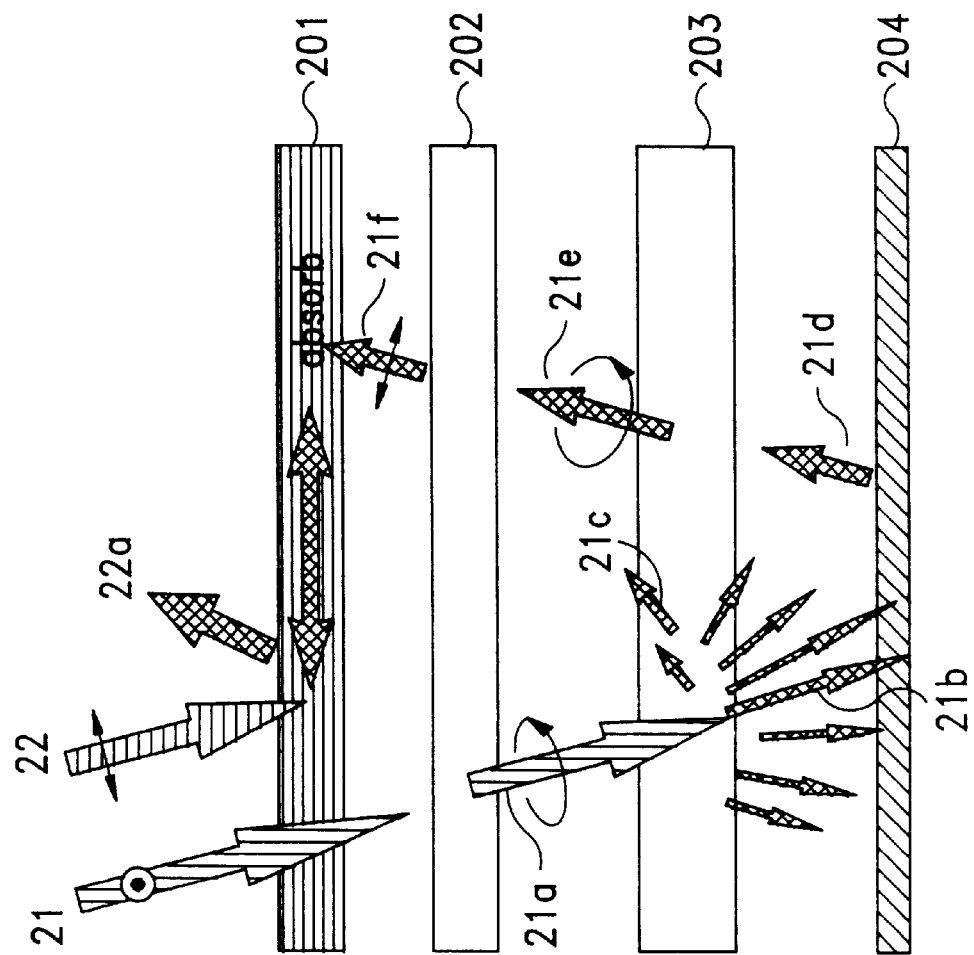
FIG. 2 is a schematic diagram of external optical components according to the preset invention.

The external optical components are illustrated in FIG. 2. An external light beam is incident on the polarizer 201, the optical component paralleled to transmission axis of the polarizer(beam 21) can pass through the polarizer 201, and the optical component perpendicular to transmission axis of the polarizer(beam 22) is reflected at the surface of the polarizer(beam 22a). The light beam passes through the polarizer is linearly polarized, this linearly polarized beam subsequently passes through a quarter-wavelength film 202 and it converts the beam to circular polarization 21a. The circularly polarized beam 21a subsequently incident into a diffuser 203, the diffuser 203 having characteristics of low back scattering, low depolarization, and no retardation, so the transmitted beam 21b is still circularly polarized. The reflector 204 subsequently reflects the transmitted beam from the diffuser 21b. This reflected beam 21d and the beam backward scattered by the diffuser 21c produce a phase shifts have π compared with the original circularly polarized transmission beam 21a due to the principle of EM waves. The reflected beam from the reflector 21d pass through the diffuser 203 doesn't change its circularly polarized state e.g. beam 21e (have inverse circularly polarized state compared with beam 21a).

Afterward, the beam 21e and the backward scattering beam 21c from the diffuser pass through the quarter-wavelength film 202, it converts these two beams(21c and 21e) into linear polarized beams 21f. The direction of linear polarization resulting from the two beams(21c and 21d) is orthogonal to the transmission beam 21 of incident light. These two beams(21c and 21e) can not pass through the polarizer 201, so the backward scattering is absorbed. Due to the elimination of backward scattering, the high contrast ratio can be achieved.

Figure 3:
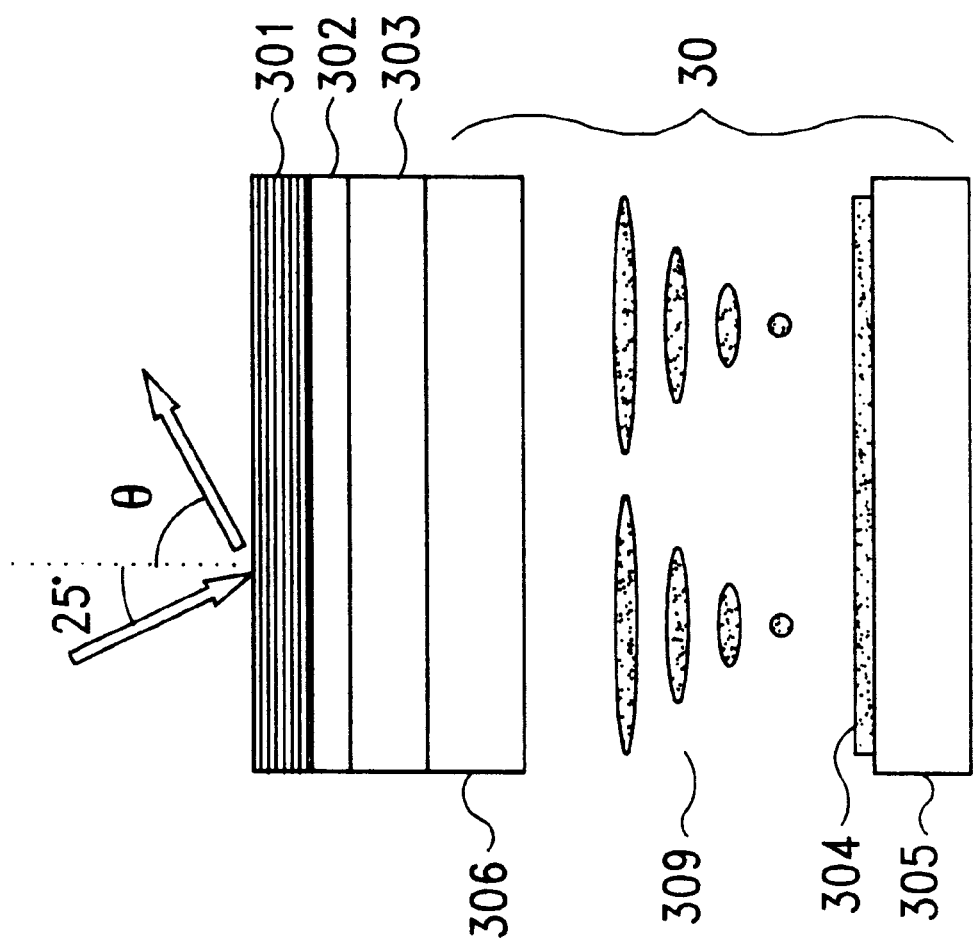
FIG. 3 is a preferred embodiment of MTN-mode reflective LCD in the present invention.

FIG. 3 shows a preferred embodiment with MTN-mode reflective-LCD, its structure is similar to the structure illustrated in FIG. 1. This display composes of a polarizer 301, a quarter-wave retardation film 302, a diffuser film 303, and a MTN cell 30. The diffuser film 303 is formed atop the LCD cell 30, the quarter-wave retardation film 302 is formed atop the diffuser film 303, and the polarizer 301 is formed atop the quarter-wave film 302. To form the MTN cell 30, a TFT substrate comprising TFTs, display electrode(metallic reflective electrode)304, etc., deposed like a matrix on a transparent substrate 305 such as glass, and an opposed substrate 306 having color filter covered by an ITO common electrode are affixed with a several $\mu$m thick liquid crystal layer 309 with mixed mode TN configuration between them. In this preferred embodiment, the liquid crystal layer is of twisted nematic configuration. The LCD cell is instead by a MTN(mixed mode twisted-nematic) cell, and a 80° MTN cell with dΔn=0.24 $\mu$m. The details of MTN(mixed mode twisted-nematic) were described in "Shin-Tson Wu and Chiung-Sheng Wu, Applied Physics Letters, Vol. 68, no.11, p1455–1457(1996)". Under these LCD cell conditions, we measure the contrast ratio and normalize intensity at various polar viewing angle θ of an incident light with 25° polar incident angle. In this preferred embodiment, the contrast ratio is greater than 30, maximum brightness greater than 4.5 times of standard white, and the viewing angle is at 0°~50°.

Figure 4:
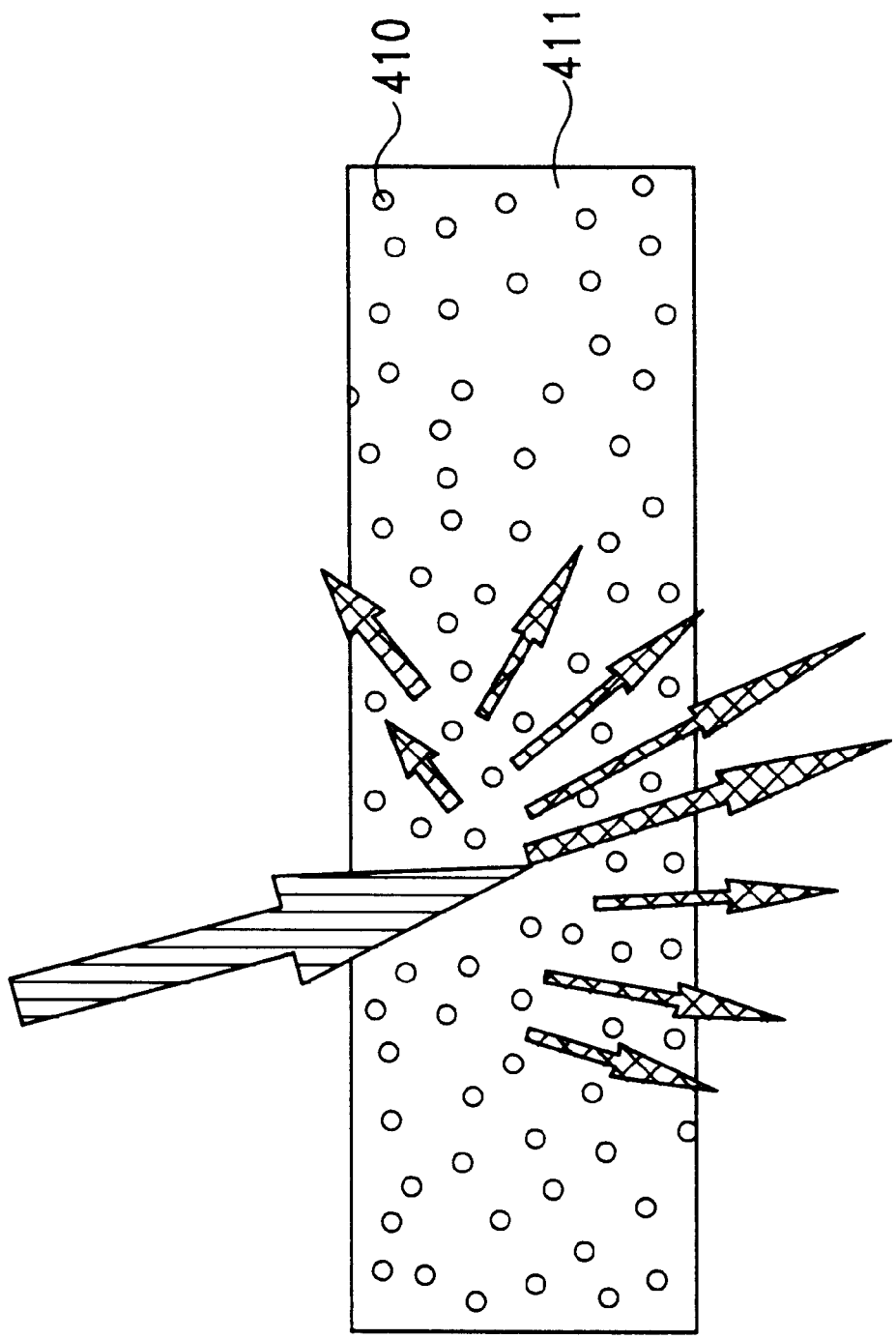
FIG. 4 is a schematic diagram of the composition of diffusive film according to the present invention.

Turning to FIG. 4, it shows a schematic diagram of the composition of diffusive film. In the diagram, we distribute transparent micro particles 410 homogeneously with diameter about 0.5~20 $\mu$m into a transparent material film 411 such as Acrylic with thickness of 20~1000 $\mu$m. The refractive index of the transparent micro particles $n_1$ is different from the refractive index of the transparent material film $n_2$.

Figure 5:
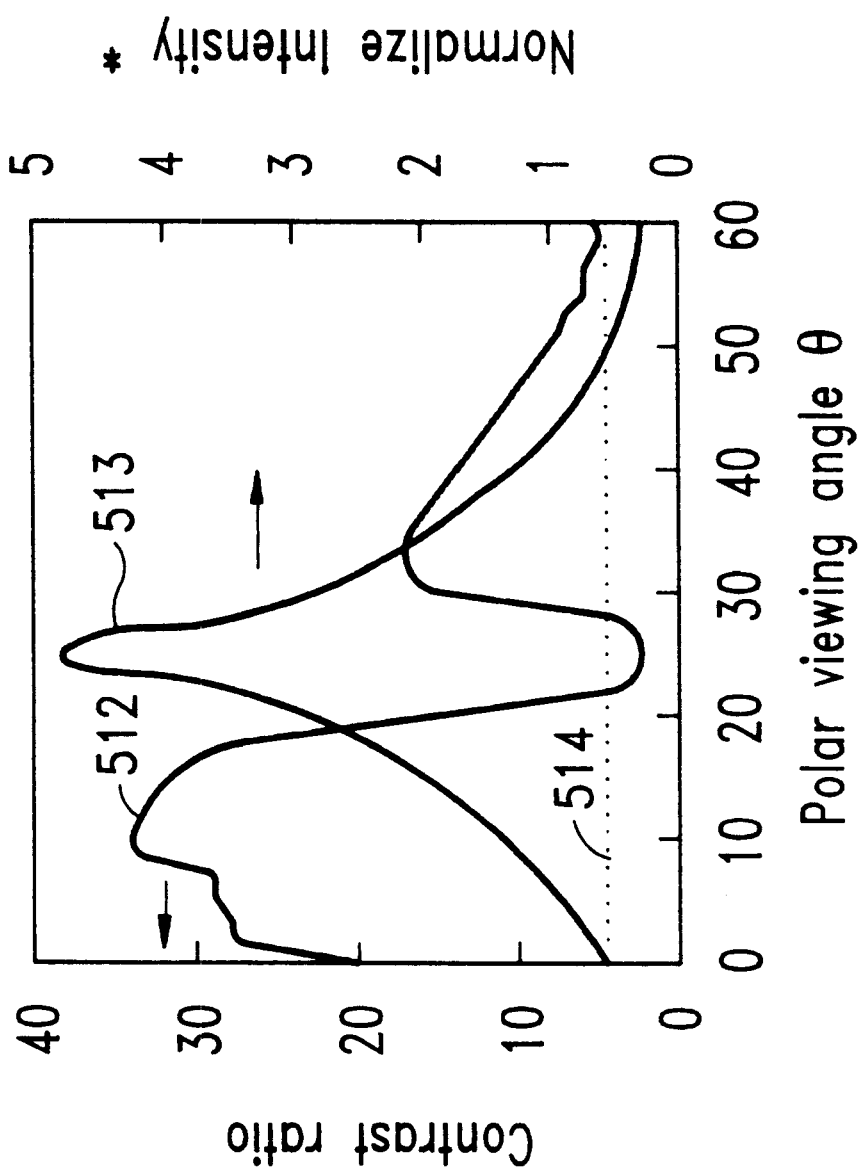
FIG. 5 is polar viewing angle dependence of contrast ratio and normalize intensity according to the preferred embodiment of FIG. 3 in the present invention.

Referring to FIG. 5, it shows polar viewing angle dependence of contrast ratio and normalize intensity according to the preferred embodiment of FIG. 3. In this diagram, curve 512 represents the contrast ratio data, curve 513 represent the intensity as normalized to the result measured from a standard white board, and dash line 514 represent the value of newspaper white (about 0.55 times standard white). We exam the data of this diagram, a maximum contrast ratio greater than 30:1 at polar viewing angle range θ=10°~15°, and a maximum normalize intensity(brightness) is 4.5 times of the standard white is measured at polar viewing angle θ=25°.

Figure 6:
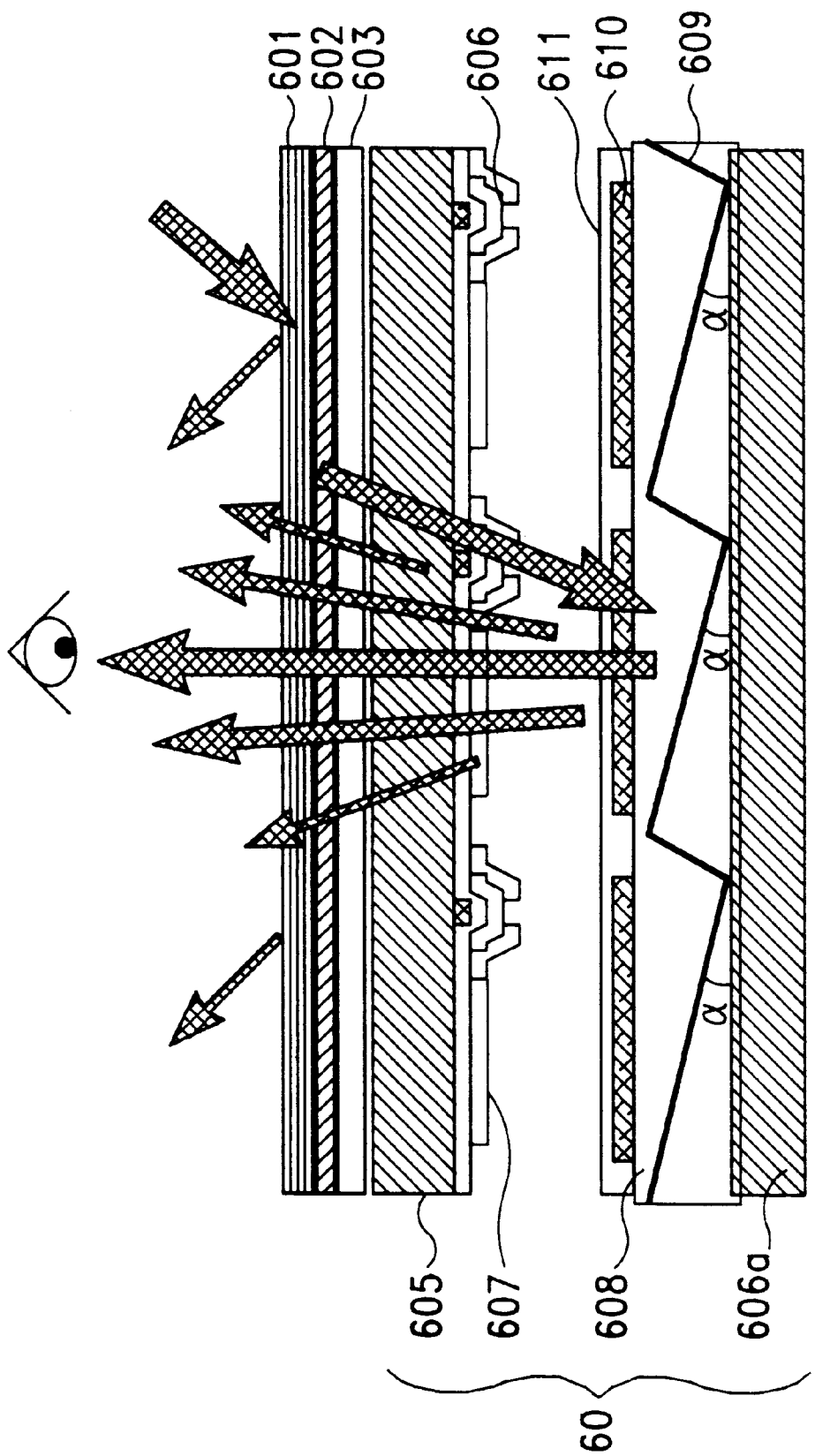
FIG.6 is a schematic diagram of a reflective color TFT LCD with tilted inner micro-mirror according to the present invention.

FIG.6 is a schematic diagram of a reflective color TFT LCD with tilted inner micro-mirror. This display composes of a polarizer 601, a quarter-wave retardation film 602, a diffuser film 603, and a LCD cell 60. The diffuser film 603 is formed atop the LCD cell 60, the quarter-wave retardation film 602 is formed atop the diffuser film 603, and the polarizer 601 is formed atop the quarter-wave film 602. To form the LCD cell 60, a flatted transparent layer 608 with tilted reflector 609(tilted micro-mirror) acted as blazed reflector formed on a transparent substrate 606a, such as glass, color filter 610 formed on the flatted transparent layer 608 and covered by an ITO 611 common electrode, and an opposed substrate having TFTs 606, deposed like a matrix on a transparent substrate 605 such as glass, ITOs 607 formed besides of the TFTs 606 acted as display electrodes and electrical connected with the TFTs 606 are affixed with a several $\mu$m thick liquid crystal layer between them. The tilted reflector 609 with a tilted angle α about 2~30°. The function of the tilted reflector 609 is to adjust the path of incident light and result the reflected light beam from various incident angles close to the normal of the LCD panel surface.

Figure 7:
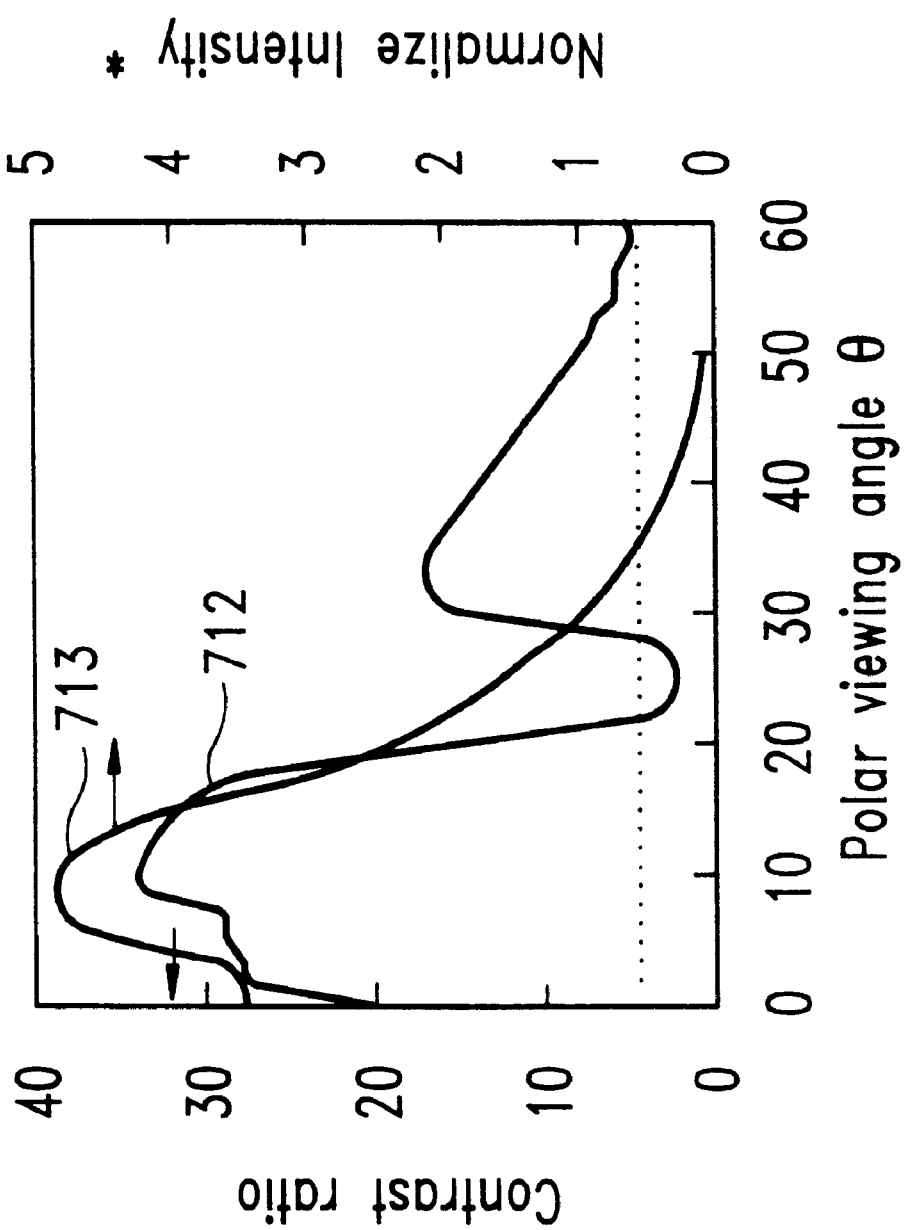
FIG. 7 is polar viewing angle dependence of contrast ratio and normalize intensity according to the preferred embodiment of FIG. 6 in the present invention.

Referring to FIG. 7, it shows polar viewing angle dependence of contrast ratio and normalize intensity(brightness) according to the preferred embodiment of FIG. 6. In this diagram, curve 712 represents the contrast ratio data, curve 713 represent the normalize intensity. We exam the data of this diagram a maximum contrast ratio, and a maximum normalize intensity(brightness) is occurred at the same polar viewing angle(θ=10°).

Figure 8:
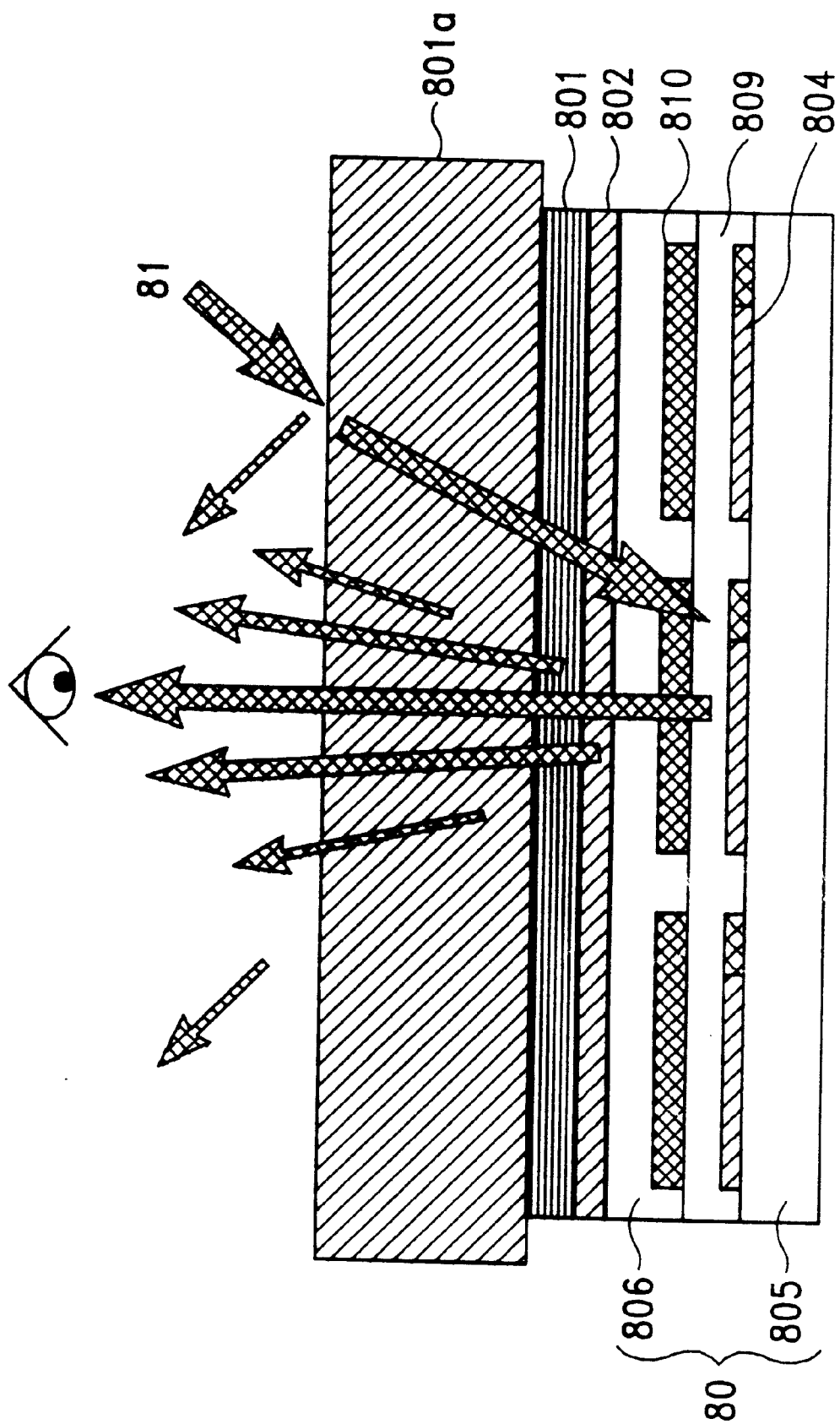
FIG. 8 is the schematic diagram of a reflective LCD with path-defined Hologram according to the present invention.

FIG. 8 is the schematic diagram of a reflective LCD with path-defined Hologram. This display composes of a volume hologram 801a, a polarizer 801, a quarter-wave retardation film 802, and a LCD cell 80. The quarter-wave film 802 is formed atop the LCD cell 80, the poarizer 801 is formed atop the quarter-wave film 802, and volume hologram 801a is formed atop the quarter-wave film 801. To form the LCD cell 80, a TFT substrate comprising TFTs(switching elements), display electrode(acted as reflective electrode), etc., deposed like a matrix on a transparent substrate 805 such as glass, and an opposed substrate 806 having color filter 810 covered by an ITO common electrode are affixed with a several $\mu$m thick liquid crystal layer 809 between them. The volume hologram 801 is translucent holographic element, it can adjust the path of incident light 81 and let maximum scattering angle of a tilted incident light beam close to the normal of LCD panel surface. In this preferred embodiment, a maximum contrast ratio, and a maximum normalize intensity(brightness) is occurred at the same polar viewing angle by the action of the volume hologram 801.

As is understood by a person skilled in the art, the foregoing preferred embodiment of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A reflective type liquid crystal display structure comprising:
    a liquid crystal display cell with a first substrate, a second substrate, said first and second substrates being located facing each other with a liquid crystal layer therebetween;

a tilted reflector being formed on the liquid crystal layer side of said first substrate, said tilted reflector comprising a transparent flatted layer and a plurality of micromirrors with a tilted angle of about 2–4 degrees formed in said transparent flatted layer;

a diffuser located atop said second substrate;

a retardation film located atop said diffuser; and a polarizer located atop said retardation film, as an entrance polarizer.

2. The reflective type liquid crystal display as claimed in claim 1, wherein said liquid crystal display cell further comprising:

a common electrode being formed on the liquid crystal side of said tilted reflector;

a plurality of display electrodes disposed in a matrix; and switching elements connected to said display electrodes being formed on the liquid crystal side of said second substrate.

3. The reflective type liquid crystal display as claimed in claim 2, wherein said display electrodes are ITOs.

4. The reflective type liquid crystal display as claimed in claim 2, wherein said switching elements are thin film transistors.

5. The reflective type liquid crystal display as claimed in claim 2, wherein said common electrode is ITO.

6. The reflective type liquid crystal display as claimed in claim 1, wherein said retardation film is a quarter-wave retardation film.

7. The reflective type liquid crystal display as claimed in claim 1, wherein said diffuser comprising:

a transparent film; and a plurality of transparent micro particles distributed in said transparent film, the refractive index of said transparent film is different from the refractive index of said transparent micro particles.

8. The reflective type liquid crystal display as claimed in claim 7, wherein said transparent film with thickness about 20~1000 $\mu$m, said transparent micro particles with diameter about 0.5~20 $\mu$m.

* * * * *